US006961719B1

(12) United States Patent
Rai

(10) Patent No.: US 6,961,719 B1
(45) Date of Patent: Nov. 1, 2005

(54) HYBRID NEURAL NETWORK AND SUPPORT VECTOR MACHINE METHOD FOR OPTIMIZATION

(75) Inventor: Man Mohan Rai, Los Altos, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 377 days.

(21) Appl. No.: 10/043,044

(22) Filed: Jan. 7, 2002

(51) Int. Cl.$^7$ .............................. G06E 1/00; G06E 3/00; G06F 15/18; G06G 7/00
(52) U.S. Cl. .............................. 706/21; 706/19; 706/25
(58) Field of Search .............................. 706/21, 19, 25

(56) References Cited

U.S. PATENT DOCUMENTS

| | | | |
|---|---|---|---|
| 4,837,798 A | 6/1989 | Cohen et al. | 379/88 |
| 4,910,765 A | 3/1990 | Matsuse et al. | 379/100 |
| 5,513,126 A | 4/1996 | Harkins et al. | 364/514 A |
| 5,630,060 A | 5/1997 | Tang et al. | 395/200.01 |
| 5,740,231 A | 4/1998 | Cohn et al. | 379/89 |
| 5,781,186 A | 7/1998 | Jennings | 345/302 |
| 5,848,415 A | 12/1998 | Guck | 707/10 |
| 5,864,870 A | 1/1999 | Guck | 707/104 |
| 6,034,970 A | 3/2000 | Levac et al. | 370/466 |
| 6,073,165 A | 6/2000 | Narasimhan et al. | 709/206 |
| 6,119,137 A | 9/2000 | Smith et al. | 707/523 |
| 6,157,945 A | 12/2000 | Balma et al. | 709/206 |
| 6,167,441 A | 12/2000 | Himmel | 709/217 |
| 6,212,550 B1 | 4/2001 | Segur | 709/206 |
| 2001/0031076 A1 * | 10/2001 | Campanini et al. | 382/128 |
| 2003/0040904 A1 * | 2/2003 | Whitman et al. | 704/212 |
| 2003/0078850 A1 * | 4/2003 | Hartman et al. | 705/26 |

OTHER PUBLICATIONS

J. A. K. Suykens et al, Recurrent Least Squares Support Vector Machines, Jul. 2000, IEEE, 1057-7122/00, 1109-1114.*
Pascal Vincent et al, A Neural Support Vector Network Architecture with Adaptive Kernels, 2000, IEEE,0-7695-0619-4, 187-19.*
Vladimir N. Vapnik, An Overview of Statistical Learning Theory, 1999, IEEE, 1045-9227/99.*
M.M. Rai and N.K. Madavan, "Aerodynamic Design Using Neural Networks", AIAA Jour., vol. 38 (2000).
V.N. Vapnik, "An Overview of Statistical Learning Theory", IEEE Trans. on Neural Networks, vol. 10 (1999) pp. 988-999.

* cited by examiner

*Primary Examiner*—Joseph P. Hirl
(74) *Attorney, Agent, or Firm*—John F. Schipper; Robert M. Padilla

(57) ABSTRACT

System and method for optimization of a design associated with a response function, using a hybrid neural net and support vector machine (NN/SVM) analysis to minimize or maximize an objective function, optionally subject to one or more constraints. As a first example, the NN/SVM analysis is applied iteratively to design of an aerodynamic component, such as an airfoil shape, where the objective function measures deviation from a target pressure distribution on the perimeter of the aerodynamic component. As a second example, the NN/SVM analysis is applied to data classification of a sequence of data points in a multidimensional space. The NN/SVM analysis is also applied to data regression.

11 Claims, 14 Drawing Sheets

Optimized airfoil sections and pressure distributions

- - - Target airfoil section  ∘∘∘ Target pressure data
——— Optimal airfoil sections  ——— Optimal pressure distributions

HYBRID NEURAL NETWORK AND SUPPORT VECTOR MACHINE METHOD FOR OPTIMIZATION

ORIGIN OF THE INVENTION

The invention disclosed herein was made by an employee of the United States Government and may be manufactured and used by or for the Government for governmental purposes without payment of any royalties for such manufacture and use.

FIELD OF THE INVENTION

This invention relates to design optimization, using a hybrid neural network and support vector machine approach to construct a response surface that models a selected objective function.

BACKGROUND OF THE INVENTION

Considerable advances have been made in the past two decades in developing advanced techniques for numerical simulation of fluid flows in aerodynamic configurations. These techniques are now mature enough to be used routinely, in conjunction with experimental results, in aerodynamic design. However, aerodynamic design optimization procedures that make efficient use of these advanced techniques are still being developed.

The design of aircraft components, such as a wing, a fuselage or an engine, involves obtaining an optimal component shape that can deliver the desired level of component performance, subject to one or more constraints (such as maximum weight or cost) that the component(s) must satisfy. Aerodynamic design can be formulated as an optimization problem that requires minimization of an objective function, subject to constraints. Many formal optimization methods have been developed and applied to aerodynamic design. These include inverse design methods, adjoint methods, sensitivity derivative-based methods and traditional response surface methodology (RSM).

Inverse design methods in aerodynamics are used to provide a component that responds in a pre-selected manner, for example, an aircraft wing that has a prescribed pressure distribution. The known inverse methods do not account for certain fluid parameters, such as viscosity, and are used in preliminary design only.

Adjoint methods provide a designer with the gradient of the objective function. One advantage of this method is that the gradient information is obtained very quickly. However, where several technical disciplines are applied simultaneously, it is often difficult to perform design optimization using this method; each discipline requires a different formulation. It is also difficult and expensive to quickly evaluate the effects of engineering tradeoffs, where the applicable constraints may be changed several times. It is also not possible to use existing experimental data or partial or unstructured data in the design process.

A sensitivity derivative-based method typically requires that a multiplicity of solutions, with one parameter varied at a time, be obtained to compute a gradient of the objective function. The number of computations required grows linearly with the number of design parameters considered for optimization, and this method quickly becomes computationally expensive. This method is also sensitive to noise present in the design data sets. As with an adjoint method, it is not possible to use existing experimental data or partial or unstructured data in the design process.

RSM provides a framework for obtaining an optimal design, using statistical procedures, such as regression analysis and design of experiments. Traditional RSM uses low-degree regression polynomials in the relevant design variables to model the variation of an objective function. The polynomial model is then analyzed to obtain an optimal design. Several polynomial models may have to be constructed to provide an adequate view of the design space. Addition of higher degree polynomials will increase the computational cost and will build in higher sensitivity to noise in the data used.

Artificial neural networks ("neural nets" herein) have been widely used in fields such as aerodynamic engineering, for modeling and analysis of flow control, estimation of aerodynamic coefficients, grid generation and data interpolation. Neural nets have been used in RSM-based design optimization, to replace or complement a polynomial-based regression analysis. Current applications of neural nets are limited to simple designs involving only a few design parameters. The number of data sets required for adequate modeling may increase geometrically or exponentially with the number of design parameters examined. A neural net analysis requires that the design space be populated with sufficiently dense simulation and/or experimental data. Use of sparse data may result in an inaccurate representation of the objective function in design space. On the other hand, inefficient use of design data in populating the design space can result in excessive simulation costs. Capacity control is critical to obtain good generalization capability. In some preceding work, this problem was alleviated by using a neural net to represent the functional behavior with respect to only those variables that result in complex, as opposed to simple, variations of the objective function; the functional behavior of the remaining variables was modeled using low degree polynomials. This requires a priori knowledge to partition the design variables into two sets.

FIG. 1 graphically illustrates results of applying a simple NN analysis to a one-parameter model, namely, an approximation to the second degree polynomial $y=2\cdot(0.5-x)^2$ at each of 3 pairs of training values (curve A) and at each of 5 pairs of training values (curve B). Use of more than the minimum number (3) of training pairs clearly improves the fit over the domain of the variable x. It is theoretically possible that only Q+1 spaced apart training value pairs are needed to completely specify a Qth degree polynomial (for example, Q=6). However, because of the presence of noise, the theoretical minimum number of training value pairs is seldom sufficient to provide an acceptable fit.

Use of neural network (NN) analysis of a physical object, in order to optimize response of the object in a specified physical environment, is well known. An example is optimization of a turbine blade shape, in two or three dimensions, in order to reproduce an idealized pressure distribution along the blade surface, as disclosed by Rai and Madavan in "Aerodynamic Design Using Neural Networks", AIAA Jour., vol. 38 (2000) pp. 173–182. NN analysis is suitable for multidimensional interpolation of data that lack structure and provides a natural structure in which a succession of numerical solutions of increasing complexity, or increasing fidelity to a real world environment, can be represented and optimized. NN analysis is especially useful when multiple design objectives need to be met.

A feed-forward neural net is a nonlinear estimation technique. One difficulty associated with use of a feed-forward neural net arises from the need for nonlinear optimization to determine connection weights between input, intermediate and output variables. The training process can be very expensive when large amounts of data need to be modeled.

In response to this, a support vector machine (SVM) approach, originally applied in statistical learning theory, has been developed and applied. Support vector machine analysis allows use of a feature space with a large dimension, through use of a mapping from input space into feature space and use of a dual formulation of the governing equations and constraints. One advantage of an SVM approach is that the objective function (which is to be minimized to obtain the coefficients that define the SVM model) is convex so that any local minimum is also a global minimum; this is not true for many neural net models. However, an underlying feature space (polynomial, Gaussian, etc.) must be specified in a conventional SVM approach, and data resampling is required to implement model hybridization. Hybridization is more naturally, and less expensively, applied in a neural net analysis.

What is needed is a machine learning algorithm that combines the desirable features of NN analysis and of SVM analysis and does not require intimate a priori familiarity with operational details of the object to be optimized. Preferably, the method should automatically provide a characterization of many or all of the aspects in feature space needed for the analysis.

SUMMARY OF THE INVENTION

The invention meets these needs by providing a hybrid of NN analysis and SVM analysis, referred to as NN/SVM analysis herein. In one embodiment, NN/SVM analysis begins with a group of associated, independent input space coordinates (parameter values), maps these coordinates into a feature space of appropriately higher dimension that includes a computed set of combinations (e.g., powers) of the input space coordinates with the assistance of the input and hidden layers of an NN, constructs an inner product formalism for the coordinates in feature space, obtains a solution to a minimization problem to compute Lagrange multiplier values that define the SVM, and returns to input space to complete a solution of the problem.

BRIEF DESCRIPTION OF THE DRAWINGS

FIGS. 9A1–9C2 graphically illustrate evolution of an airfoil and corresponding pressure distribution obtained from an iterative NN/SVM analysis.

DESCRIPTION OF BEST MODES OF THE INVENTION

Figure 2:
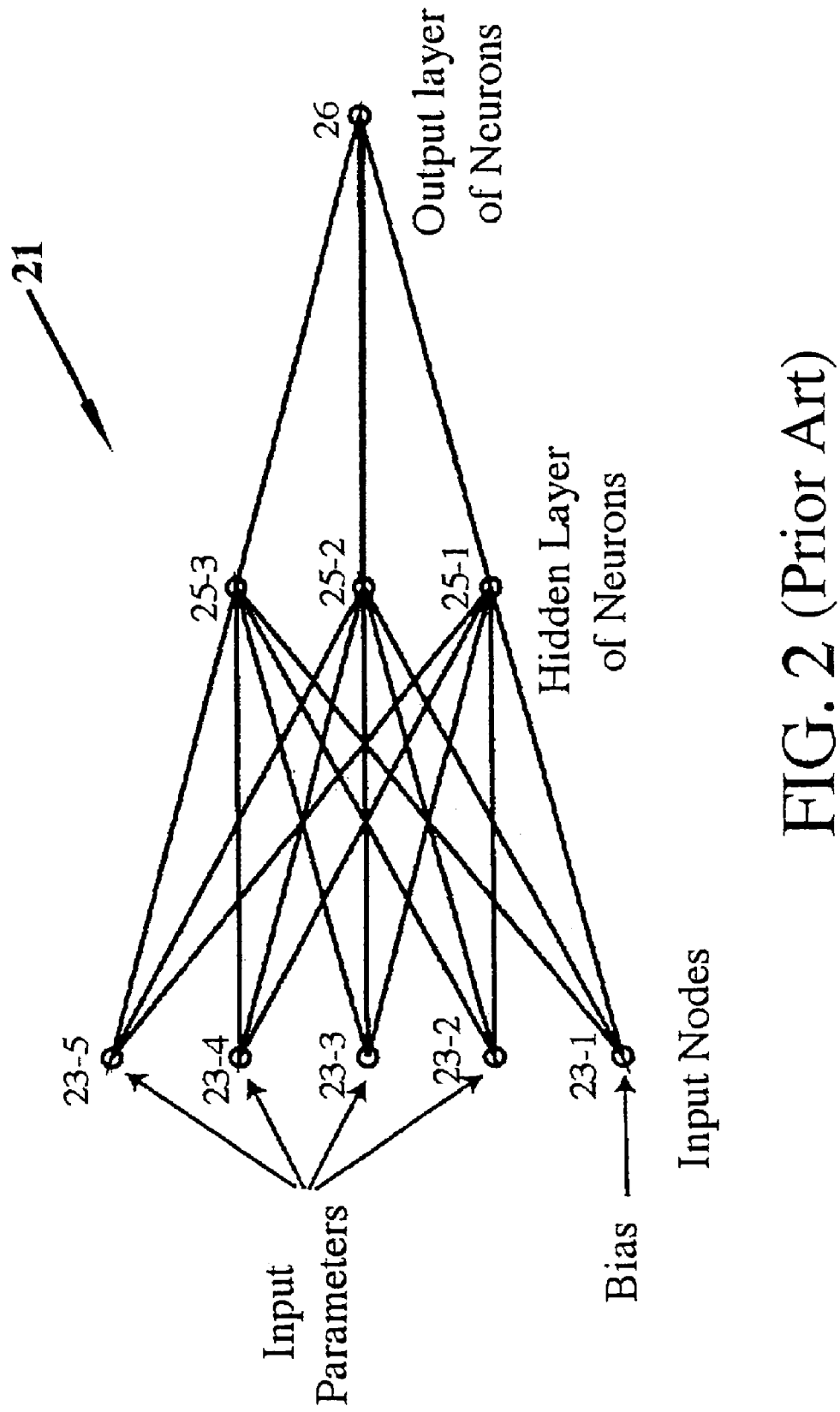
FIG. 2 is a schematic view of a three-layer feed-forward neural net in the prior art.

Consider a feed-forward neural network 21 having an input layer with nodes 23-$m$ ($m=1, \ldots, 5$), a hidden layer with nodes 25-$n$ ($n=1, 2, 3$), and an output node 26, as illustrated schematically in FIG. 2. The first input layer node 23-1 has a bias input value 1, in appropriate units. The remaining nodes of the input layer are used to enter selected parameter values as input variables, expressed as a vector $p=(p_1, \ldots, p_M)$, with $M \geq 1$. Each node 25-$n$ of the hidden layer is associated with a nonlinear activation function $$q_n = \Phi_n\left(\sum_{m=1}^{M} C_{nm} \cdot p_m\right) \tag{1}$$

of a weighted sum of the parameter values $p_m$, where $C_{nm}$ is a connection weight, which can be positive, negative or zero, linking an input node 23-$m$ with a hidden layer node 25-$n$. The output of the network 21 is assumed for simplicity, initially, to be a single-valued scalar, $$\Gamma = \sum_{n=1}^{n} D_n \cdot q_n \tag{2}$$

FIG. 2 illustrates a conventional three-layer NN, with an input layer, a hidden layer and an output layer that receives and combines the resulting signals produced by the hidden layer.

It is known that NN approximations of the format set forth in Eqs. (1) and (2) are dense in the space of continuous functions when the activation functions $\Phi_n$ are continuous sigmoidal functions (monotonically increasing functions, with a selected lower limit, such as 0, and a selected upper limit, such as 1). Three commonly used sigmoidal functions are $$\Phi(z) = 1/\{1 + exp(-z)\}, \tag{3A}$$

$$\Phi(z) = (1 + tanh(z))/2, \tag{3B}$$

$$\Phi(z) = \{\pi + 2 \cdot \tan^{-1}(z)\}/2\pi, \tag{3C}$$

$$z = \sum_{m=1}^{M} C_{nm} \cdot p_m \tag{4}$$

Other sigmoidal functions can also be used here. In the context of design optimization, a trained NN represents a response surface, and the NN output is the objective function. In multiple objective optimization, different NNs can be used for different objective functions. A rapid training algorithm that determines the connection weights $C_{nm}$ and coefficients $D_n$ is also needed here.

The approach set forth in the preceding does reasonably well in an interpolative mode, that is, in regions where data points (parameter value vectors) are reasonably plentiful. However, this approach rarely does well in an extrapolative mode. In this latter situation, a precipitous drop in estimation accuracy may occur as one moves beyond the convex hull defined by the data point locations. In part, this is because the sigmoidal functions are not the most appropriate basis functions for most data modeling situations. Where the underlying function(s) is a polynomial in the parameter values, a more appropriate set of basis functions is a set of Legendre functions (if the parameter value domain is finite), or a set of Laguerre or Hermite functions (if the parameter value domain is infinite). Where the underlying function(s) is periodic in a parameter value, a Fourier series may be more appropriate to represent the variation of the function with that parameter.

Two well known approaches are available for reducing the disparity between an underlying function and an activation function. A first approach, relies on neural nets and uses appropriate functions of the primary variables as additional input signals for the input nodes. These functions simplify relationships between neural net input and output variables but require a priori knowledge of these relationships, including specification of all the important nonlinear terms in the variables. For example, a function of the (independent) parameter values x and y, such as $$h(x,y) = a \cdot x^2 + b \cdot x \cdot y + c \cdot y^2 + d \cdot x + e \cdot y + f, \quad (5)$$

where a, b, c, d, e and f are constant coefficients, would be better approximated if the terms x, y, $x^2$, x·y and $y^2$ are all supplied to the input nodes of the network 21. However, in a more general setting with many parameters, this leads to a very large number of input nodes and as-yet-undetermined connection weights $C_{nm}$.

A second approach, referred to as a support vector machine (SVM), provides a nonlinear transformation from the input space variables $p_m$ into a feature space that contains the original variables $p_m$ and the important nonlinear combinations of such terms (e.g., $(p_1)^2$, $(p^1)(p_2)^3(p_M)^2$ and exp $(p_2)$) as coordinates. For the example function $h(p_1,p_2)$ set forth in Eq. (5), the five appropriate feature space coordinates would be $p_1$, $p_2$, $(p_1)^2$, $p_1 \cdot p_2$ and $(p_2)^2$. Very high dimensional feature spaces can be handled efficiently using kernel functions for certain choices of feature space coordinates. The total mapping between the input space of individual variables (first power of each parameter $p_m$) and the output space is a hyperplane in feature space. For a model that requires only linear terms and polynomial terms of total degree 2 (as in Eq. (5)), in the input space variables, the model can be constructed efficiently using kernel functions that can be used to define inner products between vectors in feature space. However, use of an SVM requires a priori knowledge of the functional relationships between input and output variables.

The mapping between the input space parameters and the output function is defined using a kernel function and certain Lagrange multipliers. The Lagrange multipliers are obtained by maximizing a function that is quadratic and convex in the multipliers, the advantage being that every local minimum is also a global minimum. By contrast, a neural net often exhibits numerous local minima of the training error(s) that may not be global minima. However, several of these local minima may provide acceptable training errors. The resulting multiplicity of acceptable weight vectors can be used to provide superior network generalization, using a process known as network hybridization. A hybrid network can be constructed from the individual trained networks, without requiring data re-sampling or similar expensive techniques.

An attractive feature of a neural net, vis-a-vis an SVM, is that the coordinates used in a feature space do not have to be specified (e.g., via kernel functions). However, use of an SVM, in contrast to use of a neural net, allows one to introduce features spaces with a large number of dimensions, without a corresponding increase in the number of coefficients.

A primary contribution of the present invention is to provide a mechanism, within the NN component, for determining at least the coordinate (parameter) combinations needed to adequately define the feature space for an SVM, without requiring detailed knowledge of the relationships between input parameters and the output function.

Figure 3:
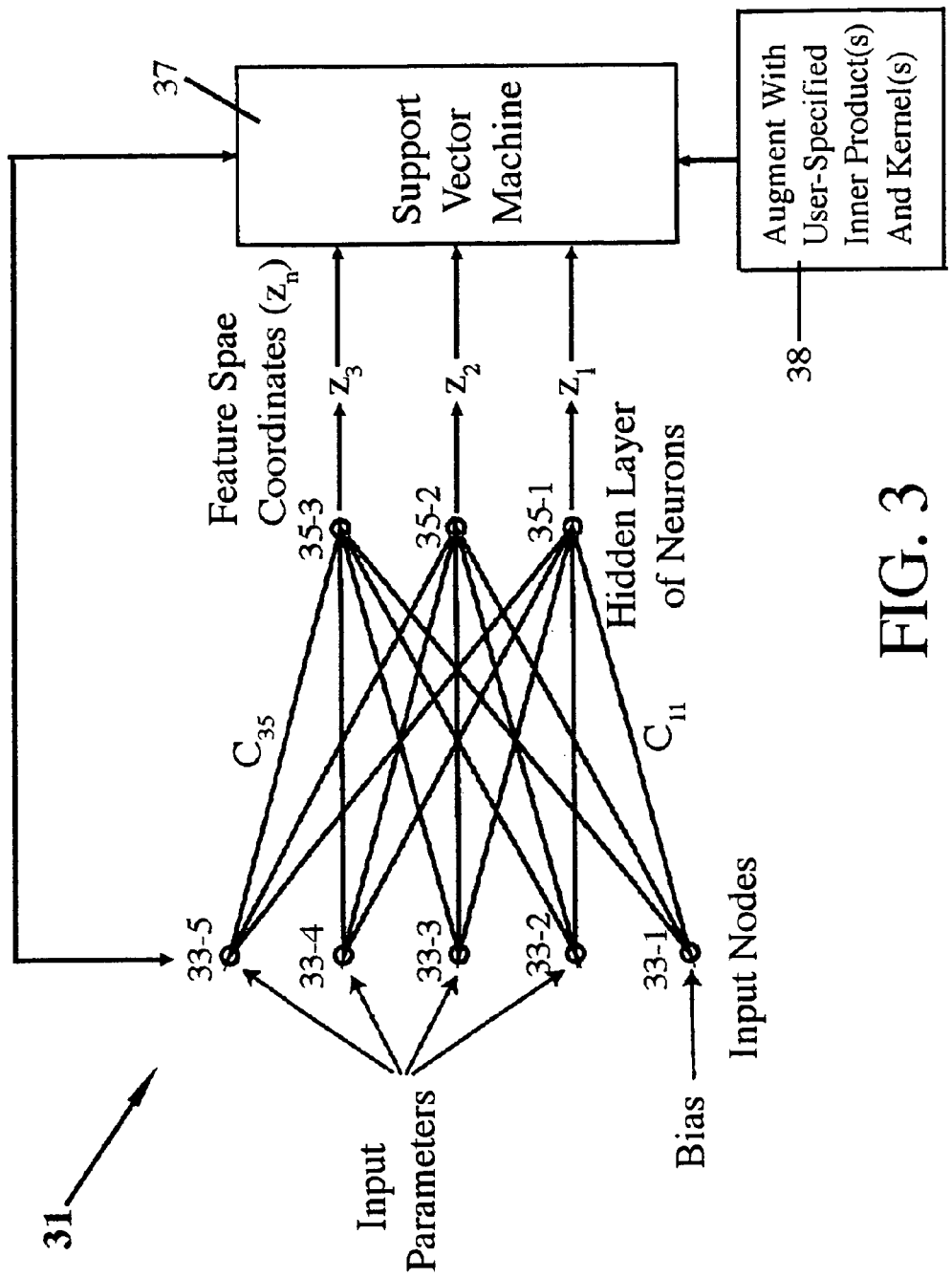
FIG. 3 is a schematic view of a two-layer feed-forward NN/SVM system according to the invention.

FIG. 3 is a schematic view of an NN/SVM system 31, including an NN component and an SVM component, according to the invention. The system 31 includes input layer nodes 33-$i$ (i=1, . . . , 5) and hidden layer nodes 35-$j$ (j=1, 2, 3). FIG. 3 also indicates some of the connection weights associated with connections of the input layer terminals and the hidden layer terminals. More than one hidden layer can be provided. The hidden layer output signals are individually received at an SVM 37 for further processing, including computation of a training error. If the computed training error is too large, one or more of the connection weights is changed, and the (changed) connection weights are returned to the NN component input terminals for repetition of the procedure. Optionally, the SVM 37 receives one or more user-specified augmented inner product or kernel prescriptions (discussed in the following), including selected combinations of coordinates to be added, from an augmentation source 38.

Figure 4:
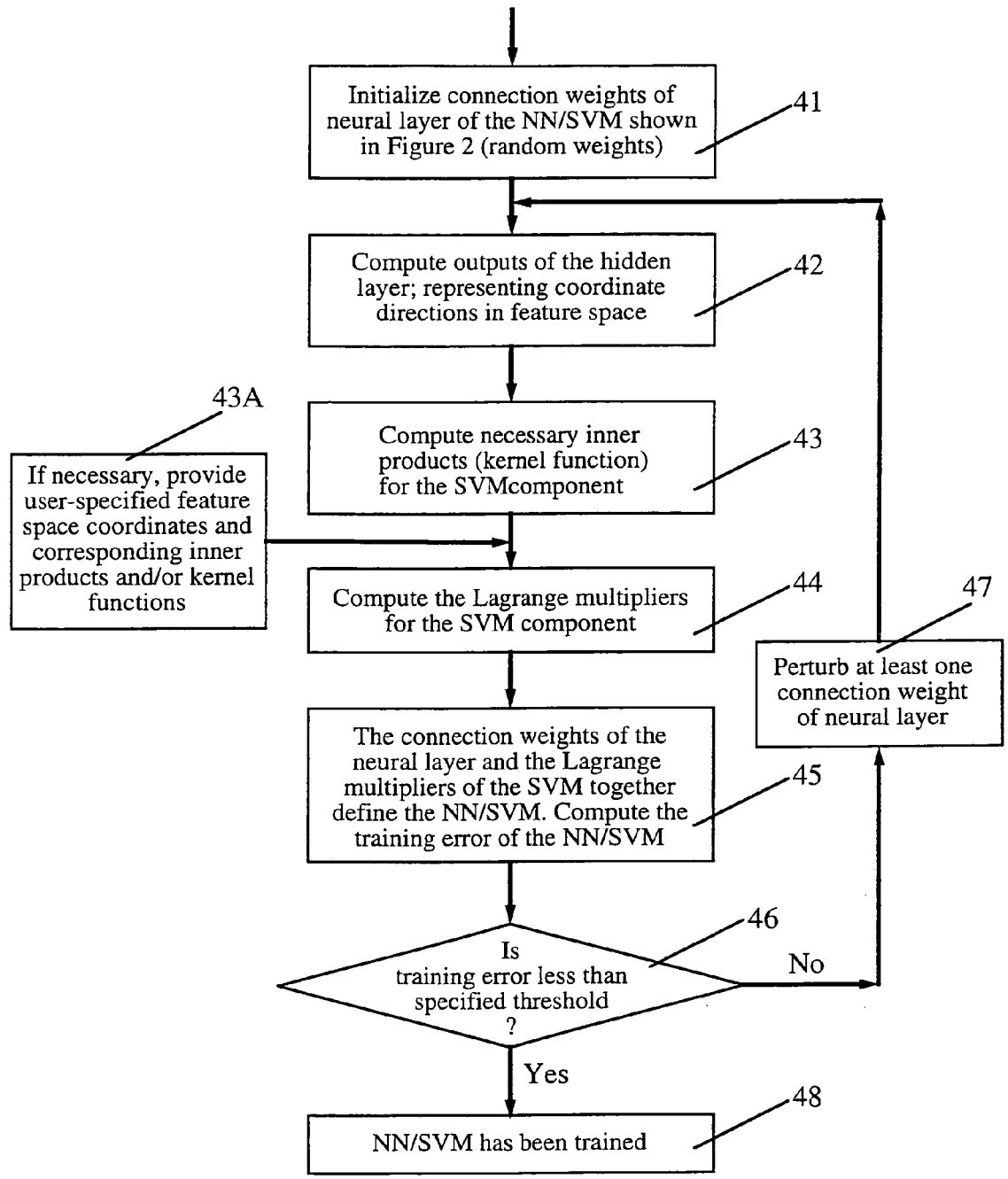
FIG. 4 is a flow chart of an overall procedure for practicing the invention using an NN/SVM system.

FIG. 4 is a flow chart illustrating an overall procedure according to the invention. In step 41, the system provides (initial) values for connection weights $C_{nm}$ for the input layer-hidden layer connections. These weights may be randomly chosen. The input signals may be a vector of parameter values p= ($p_1$, . . . , $p_M$) (M=5 in FIG. 3) in parameter space. In step 42, output signals from the hidden layer are computed to define the feature space for the SVM. The NN component of the system will provide appropriate combinations of the parameter space coordinates as new coordinates in a feature space for the SVM (e.g., $u_1=p_1$, $u_2=p_2$, $u_3=p_1^2$, $u_4=p_1 \cdot p_2$, $u_5=p_2^2$, from Eq. (5))

In step 43, feature space inner products that are required for the SVM are computed. In step 43A, user-specified feature space coordinates and corresponding inner products and kernel functions are provided. Note that the feature space is a vector space with a corresponding inner product.

In step 44, a Lagrange functional is defined and minimized, subject to constraints, to obtain Lagrange multiplier values for the SVM. See the Appendix for a discussion of a Lagrange functional and associated constraints. In step 45, the NN connection weights and the Lagrange multiplier coefficients are incorporated and used to compute a training error associated with this choice of values within the NN/SVM.

In step 46, the system determines if the training error is no greater than a specified threshold level. If the answer to the query in step 46 is "no", the system changes at least one connection weight, in step 47, preferably in a direction that is likely to reduce the training error, and repeats steps 42–46. If the answer to the query in step 46 is "yes", the system interprets the present set of connection weights and Lagrange multiplier values as an optimal solution of the problem, in step 48.

Note that steps 42–48 can be embedded in an optimization loop, wherein the connection weights are changed according to the rules of the particular optimization method used.

The hybrid NN/SVM system relies on the following broadly stated actions: (1) provide initial random (or otherwise specified) connection weights for the NN; (2) use the activation function(s) and the connection weights associated with each hidden layer unit to construct inner products for the SVM; (3) use the inner products to compute the Lagrange multiplier values; (4) compute a training error associated with the present values of the connection weights and Lagrange multiplier values; (5) if the training error is too large, change at least one connection weight and repeat steps (2)–(4); (6) if the training error is not too large, accept the resulting values of the connection weights and the Lagrange multiplier values as optimal.

This method has several advantages over a conventional SVM approach. First, coordinates that must be specified a priori in the feature space for a conventional SVM are determined by the NN component in an NN/SVM system. The feature space coordinates are generated by the NN component to correspond to the data at hand. In other words, the feature space provided by the NN component evolves to match or correspond to the data. A feature space that evolves in this manner is referred to as "data-adaptive." The feature space coordinates generated by the NN component can be easily augmented with additional user-specified feature space coordinates (parameter combinations) and kernel functions.

Second, use of activation functions that are nonlinear functions of the connection weights in the NN component reintroduces the possibility of multiple local minima and provides a possibility of hybridization without requiring data resampling.

The feature spaces generated by the NN hidden layer can be easily augmented with high-dimensional feature spaces without requiring a corresponding increase in the number of connection weights. For example, a polynomial kernel containing all monomials and binomials (degrees one and two) in the parameter space coordinates can be added to an inner product generated by the SVM component, without requiring any additional connection weights or Lagrange multiplier coefficients.

The NN/SVM system employs nonlinear optimization methods to obtain acceptable connection weights, but the weight vectors thus found are not necessarily unique. Many different weight vectors may provide acceptably low training errors for a given set of training data. This multiplicity of acceptable weight vectors can be used to advantage. If validation data are available, one can select the connection weight vector and resulting NN/SVM system with the smallest validation error. In aerodynamics, this requires additional simulations that can be computationally expensive.

If validation data are not available, multiple trained NNs or NN/SVM systems can be utilized by creating a hybrid NN/SVM. A weighted average of N output signals from trained NN/SVMs in a hybrid NN/SVM is formed as a new solution. Where the weights are equal, if errors for the N individual output solutions are uncorrelated and individually have zero mean, the least squares error of this new solution is approximately a factor of N less than the average of the least squares errors for the N individual solutions. When the errors for the N individual output solutions are partly correlated, the hybrid solution continues to produce a least squares error that is smaller than the average of the least squares errors for the N individual solutions, but the difference is not as large. The N trained NN/SVMs used to form a hybrid system need not have the same architecture or be trained using the same training set.

Figure 5:
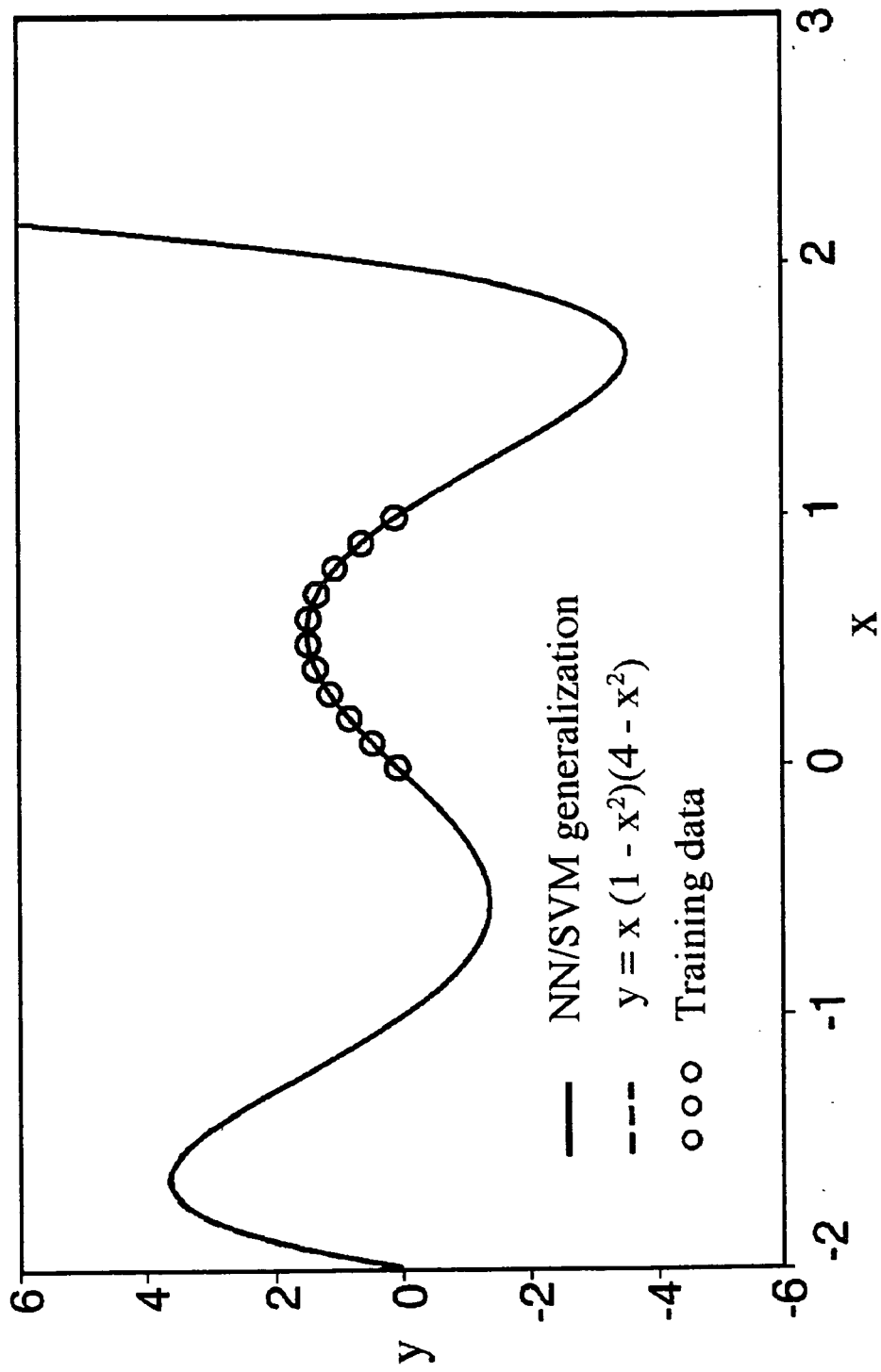
FIGS. 5, 6 and 7 graphically illustrate generalization curves obtained for a fifth degree polynomial, a logarithm function and an exponential function, respectively, using a hybrid NN/SVM analysis and 11 training values.

FIG. 5 graphically illustrates results of applying an NN/SVM analysis according to the invention to a six-parameter model, namely, an approximation to the fifth degree polynomial $y=x(1-x^2)(4-x^2)$. Data are provided at each of 11 training locations (indicated by small circles on the curve) in the domain of the variable x. After a few iterations of an NN/SVM analysis, the 11 training values, $(x_k, y_k) = (x_k, x_k(1-x_k^2)(4-x_k^2))$, provide the solid curve as a generalization, using the NN/SVM analysis. The dashed curve (barely visible in FIG. 5) is a plot of the original fifth order polynomial.

Figure 6:
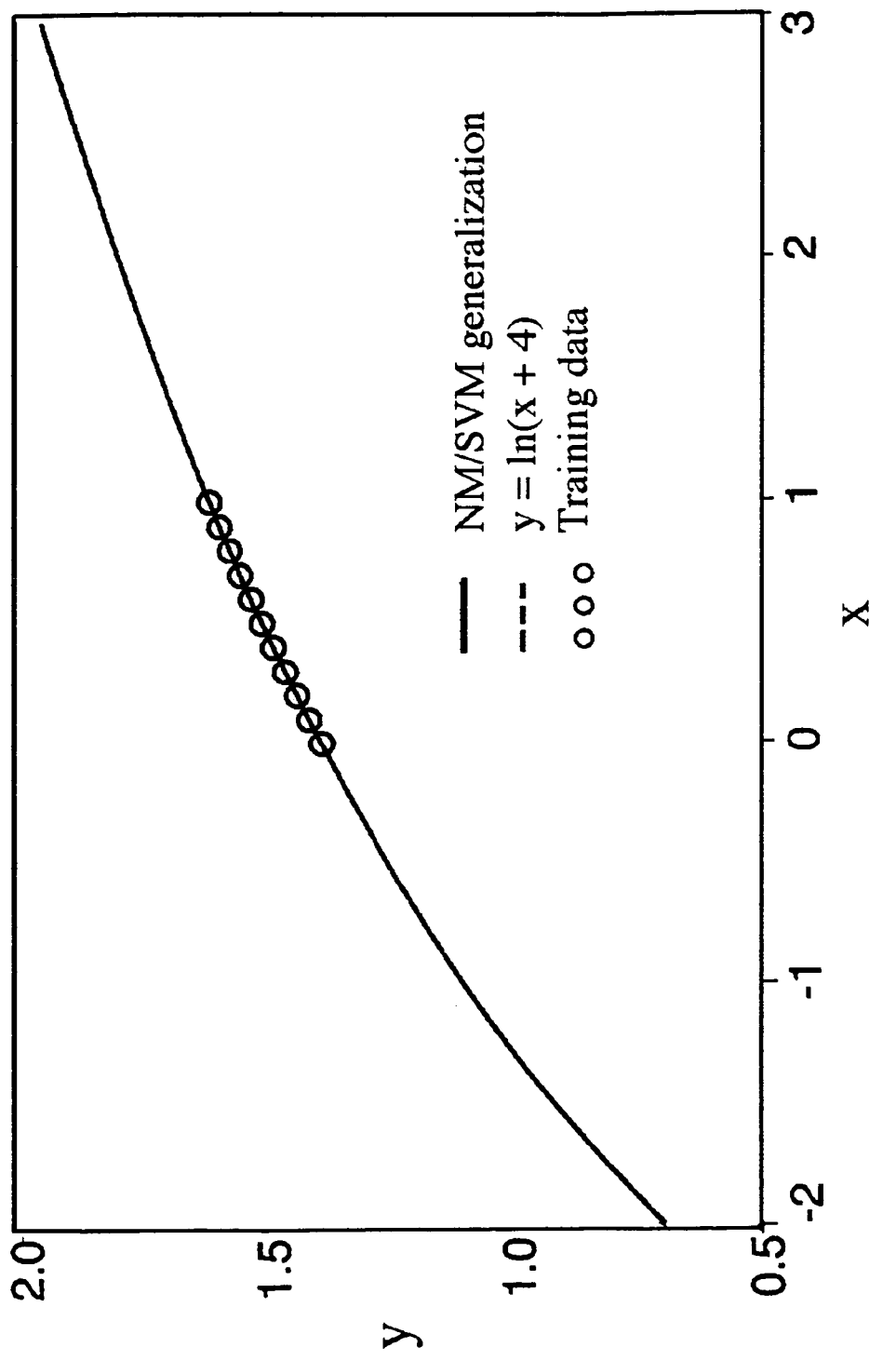

FIG. 6 graphically illustrates similar results of an application of the NN/SVM analysis to a logarithm function, $y=\ln(x+4)$, using 11 training values. The solid curve is the generalization provided by the NN/SVM analysis.

Figure 7:
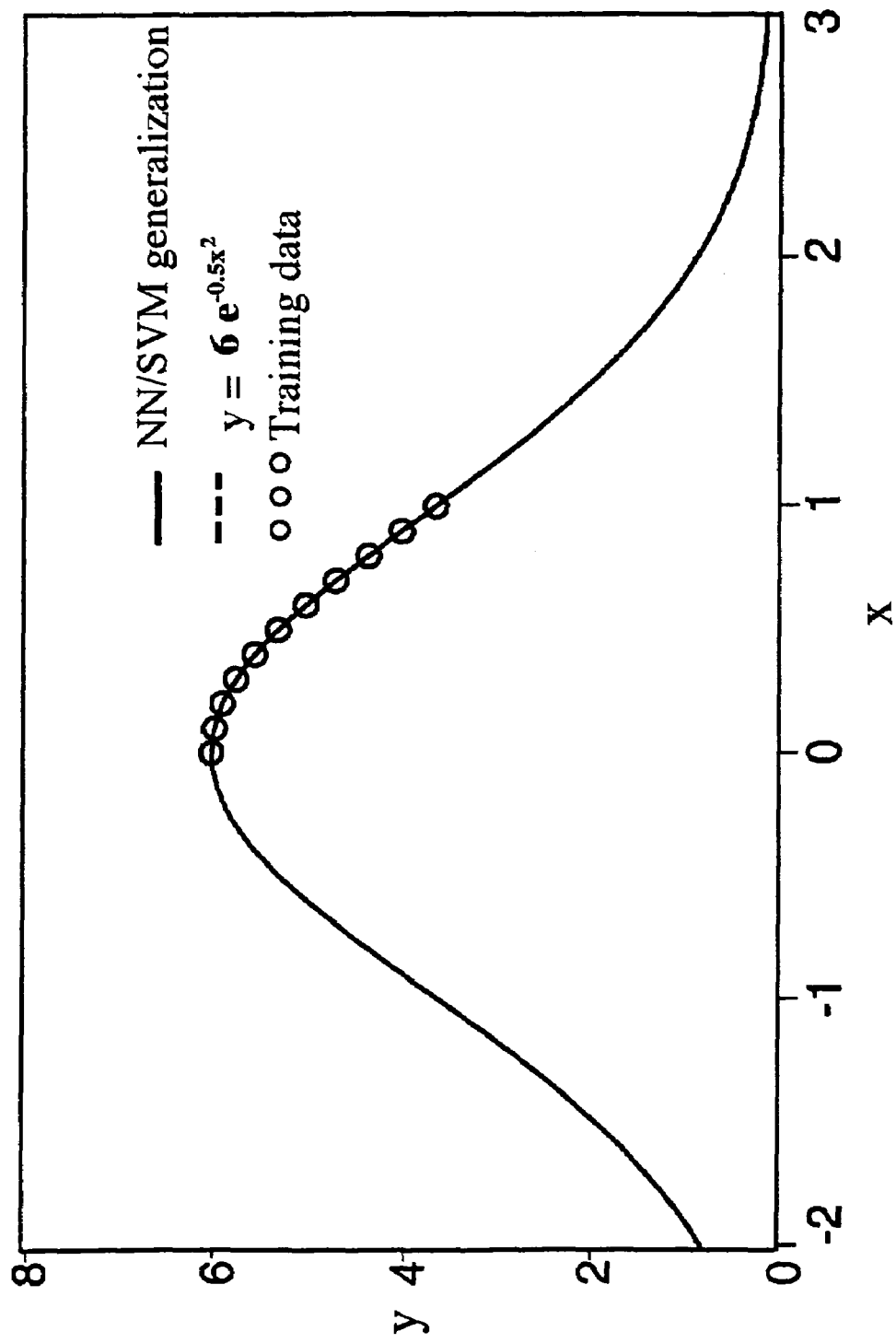

FIG. 7 graphically illustrates similar results of an application of the NN/SVM analysis to an exponential function, $y=6 \cdot \exp(-0.5 \cdot x^2)$, using 11 training values. The solid curve is the generalization provided by the NN/SVM analysis, using the 11 training values.

The generalization in each of FIGS. 5, 6 and 7 is vastly superior to corresponding generalizations provided by conventional approaches. In obtaining such a generalization, the same computer code can be used, with no change of parameters or other variables required.

Figure 8A:
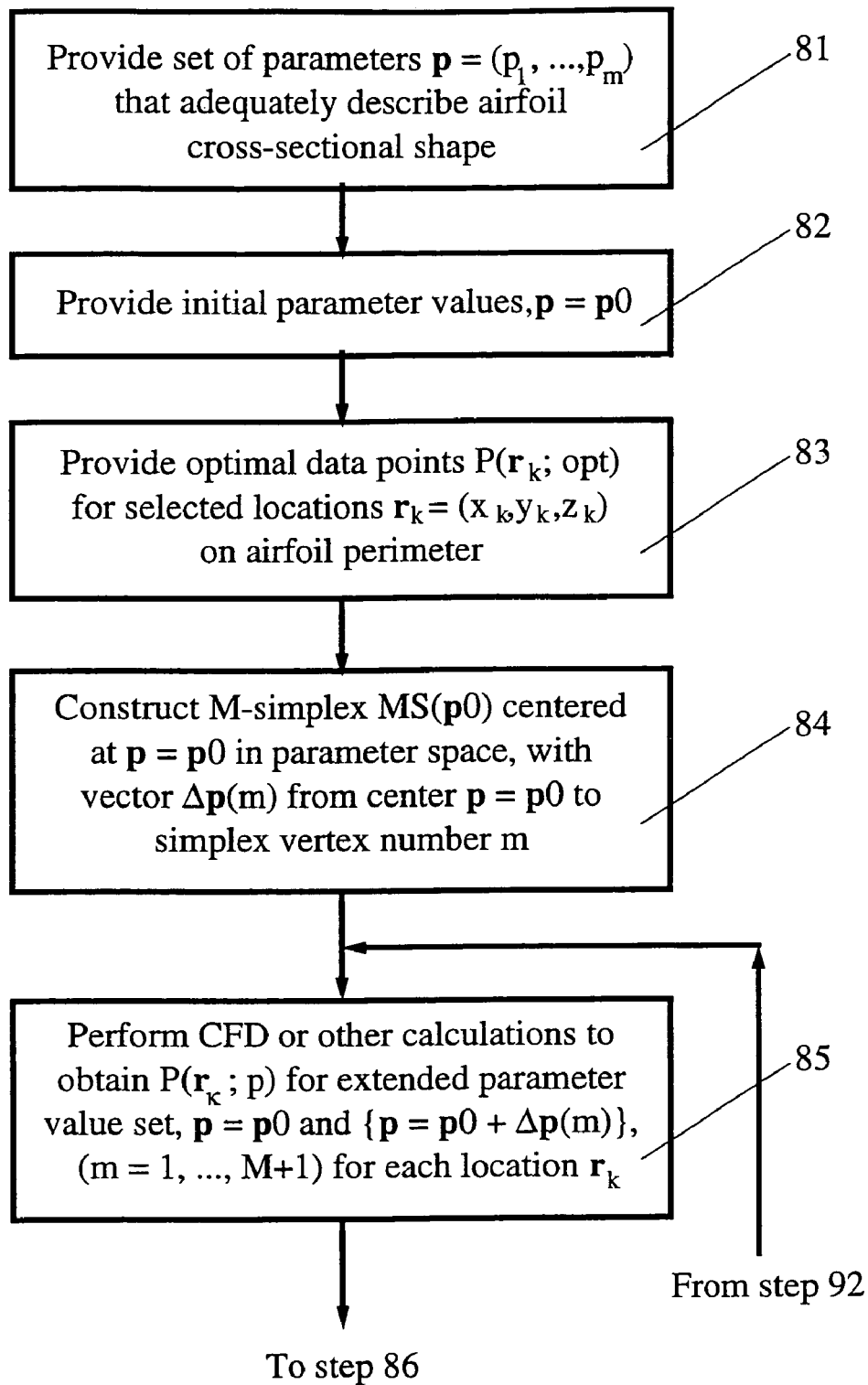
FIGS. 8A/8B/8C are a flow chart for an RSM procedure used in practicing the invention.
Figure 8B:
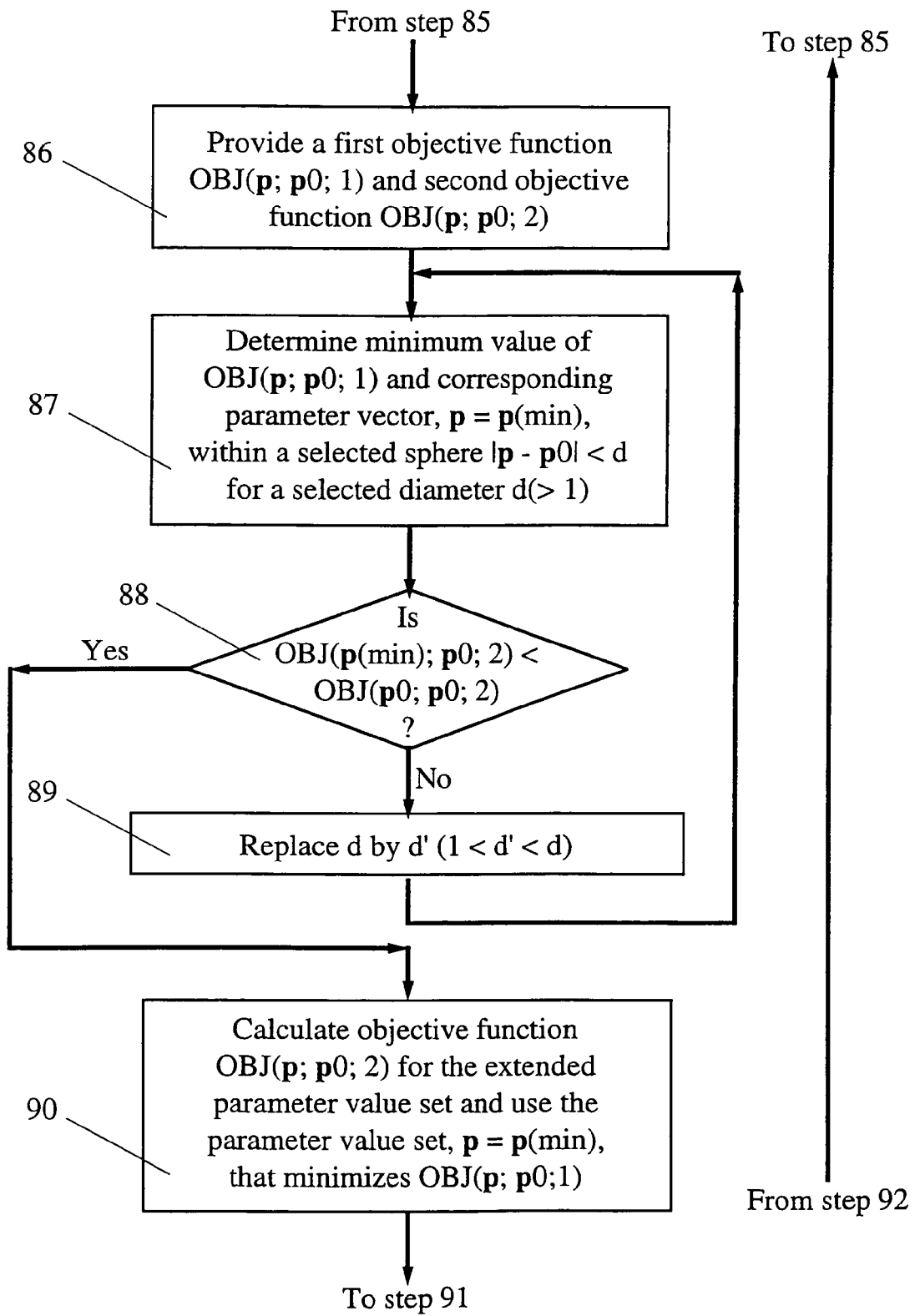
Figure 8C:
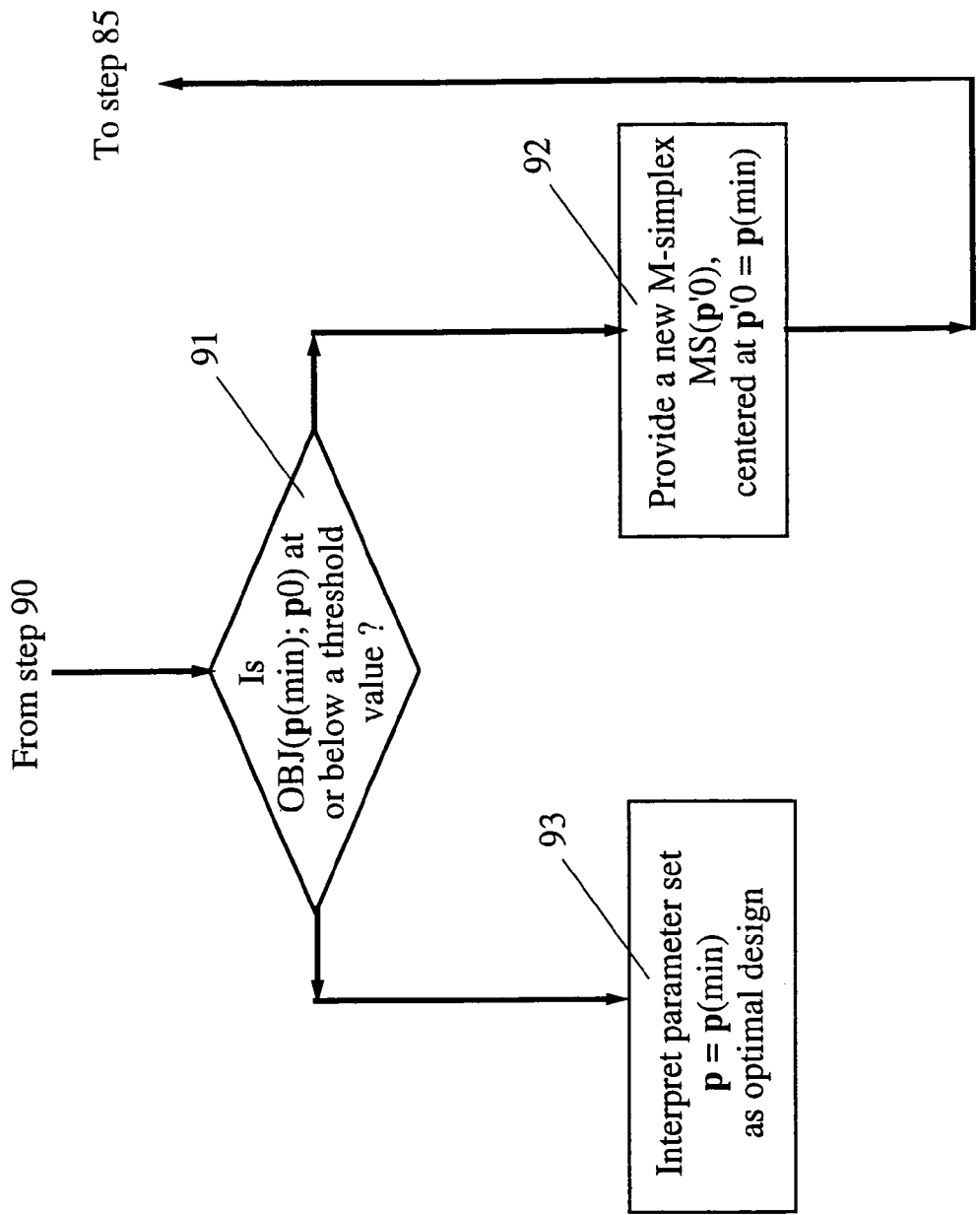

FIGS. 8A, 8B and 8C are a flow chart illustrating the application of a response surface methodology (RSM) used in this invention to obtain an optimal cross-sectional shape of an airfoil, as an example, where specified pressure values at selected locations on the airfoil perimeter are to be matched as closely as possible. In step 81, a set of parameters, expressed here as a vector $p=(p_1, \ldots, p_M)$, is provided that adequately describes the airfoil cross-sectional shape (referred to as a "shape" herein), where M ($\geq 1$) is a selected positive integer. For example, the airfoil shape might be described by (1) first and second radii that approximate the shape of the airfoil at the leading edge and at the trailing edge, (2) four coefficients that describe a tension spline fit of the upper perimeter of the airfoil between the leading and trailing edge shapes, and (3) four coefficients that describe a tension spline fit of the lower perimeter of the airfoil between the leading and trailing edge shapes, a total of ten parameters. In a more general setting, the number M of parameters may range from 2 to 20 or more.

In step 82, initial values of the parameters, p=p0, are provided from an initial approximation to the desired airfoil shape.

In step 83, optimal data values $P(r_k; opt)$ (e.g., airfoil pressure values or airfoil heat transfer values) are provided at selected locations $r_k = (x_k, y_k, z_k)$ (k= 1, ..., K) on the airfoil perimeter.

In step 84, an equilateral M-simplex, denoted MS(p0), is constructed, with a centroid or other selected central location at p=p0, in M-dimensional parameter space, with vertices lying on a unit radius sphere. Each of the M+1 vertices of the M-simplex MS(p0) is connected to the centroid, p=p0, by a vector $\Delta p(m)$ (m=1, ..., M+1) in parameter space. More than the M+1 vertices can be selected and used within the M-simplex. For example, midpoints of each of the M(M+1)/2 simplex edges can be added to the M+1 vertices. These additional locations will provide a more accurate NN/SVM model.

In step 85, a computational fluid dynamics (CFD) or other calculation is performed for an extended parameter value set, consisting of the parameter value vectors p=p0 and each of the M+1 M-simplex vertices, P=$P_{vert}$=P0+Δp(m), to obtain a calculated pressure distribution P($r_k$;$p_{vert}$) at each of the selected perimeter locations, r=$r_k$ for each of these parameter value sets. One hybrid NN/SVM is assigned to perform the analysis for all vertices in the M-simplex MS(p0) at each location $r_k$. That is, a total of K NN/SVM systems are used to model the overall pressure dependence on the parameters $p_m$. The calculated pressure distribution P($r_k$;$p_{vert}$) and/or the airfoil can be replaced by any other suitable physical model, in aerodynamics or in any other technical field or discipline. Used together, the trained NN/SVM systems will provide the pressure distribution P($r_k$;p) for general parameter value vectors p.

In step 86, a first objective function, such as $$OBJ(p; p0; 1) = \sum_{k=1}^{K} w_k \{P(r_k; p) - P(r_k; opt)\}^2, \quad (6A)$$

is introduced, where $\{w_k\}$ is a selected set of non-negative weight coefficients.

In step 87, the minimum value of the first objective function OBJ(p;p0;1) and a corresponding parameter vector p=p(min) are determined for parameter vectors p within a selected sphere having a selected diameter or dilatation factor d, defined by |p−p0|≦d, with 1<d≦10. The process is performed using a nonlinear optimization method. Other measures of extrapolation can also be used here.

In step 88, the system calculates a second objective function, which may be the first objective function or (preferably) may be defined as $$OBJ(p; p0; 2) = \sum_{k=1}^{K} w_k \{P(r_k; p; CFD) - P(r_k; opt)\}^2, \quad (6B)$$

where P($r_k$;p;CFD) is a pressure value computed using a CFD simulation, for p= p(min) and p=p0. The system then determines if OBJ(p(min);p0;2)<OBJ(p0;p0;2) for the intermediate minimum value parameter vector, p=p(min). One can use the first objective function OBJ(p;p0;1), defined in Eq. (6A), rather than the objective function OBJ(p;p0;2) defined in Eq. (6B), for this comparison, but the resulting inaccuracies may be large.

If the answer to the query in step 88 is "no" for the choice of dilatation factor d, the dilatation factor d is reduced to a smaller value d' (1<d'<d), in step 89, and steps 88 and 89 are repeated until the approximation pressure values $\{P(r_k;p)\}_k$ for the extrapolated parameter value set provide an improved approximation for the optimal values for the same airfoil perimeter locations, r=$r_k$.

If the answer to the query in step 88 is "yes", the system moves to step 90, uses the (modified) objective function and uses the intermediate minimum-cost parameter value set, p=p(min), which may lie inside or outside the M-simplex MS(p0) in parameter space. Minimization of the objective function OBJ(p;p0) may include one or more constraints, which may be enforced using the well known method of penalty functions. The (modified) objective function definition in Eq. (6A) (or in Eq. (6B)) can be replaced by any other positive definite definition of an objective function, for example, by $$OBJ(p; p0) = \sum_{k=1}^{K} w_k |P(r_k; p) - P(r_k; opt)|q, \quad (6C)$$

where q is a selected positive number.

If the original parameter value set p has an insufficient number of parameters, this will become evident in the preceding calculations, and the (modified) objective function OBJ(p(min);p0) or OBJ(p(min);p0)* will not tend toward acceptably small numbers. In this situation, at least one additional parameter would be added to the parameter value set p and the procedure would be repeated. In effect, an NN/SVM procedure used in an RSM analysis will require addition of (one or more) parameters until the convergence toward a minimum value that is acceptable for an optimized design.

In step 91, the system determines if the (modified) objective function OBJ(p(min);p0)* is no greater than a selected threshold number (e.g., 1 or $10^{-4}$, in appropriate units). If the answer to the query in step 91 is "no", a new M-simplex MS(p'0) is formulated, in step 92, with p'0=p(min) as the new center, and steps 85–90 are repeated at least once. Each time, a new parameter value set, p=p(min), is determined that approximately minimizes the objective function OBJ(p; p'0).

If the answer to the query in step 91 is "yes", the system interprets the resulting parameter set, p=p(min), and the design described by this parameter set as optimal, in step 93. The method set forth in steps 81–93 is referred to herein as a response surface method.

Figure 1:
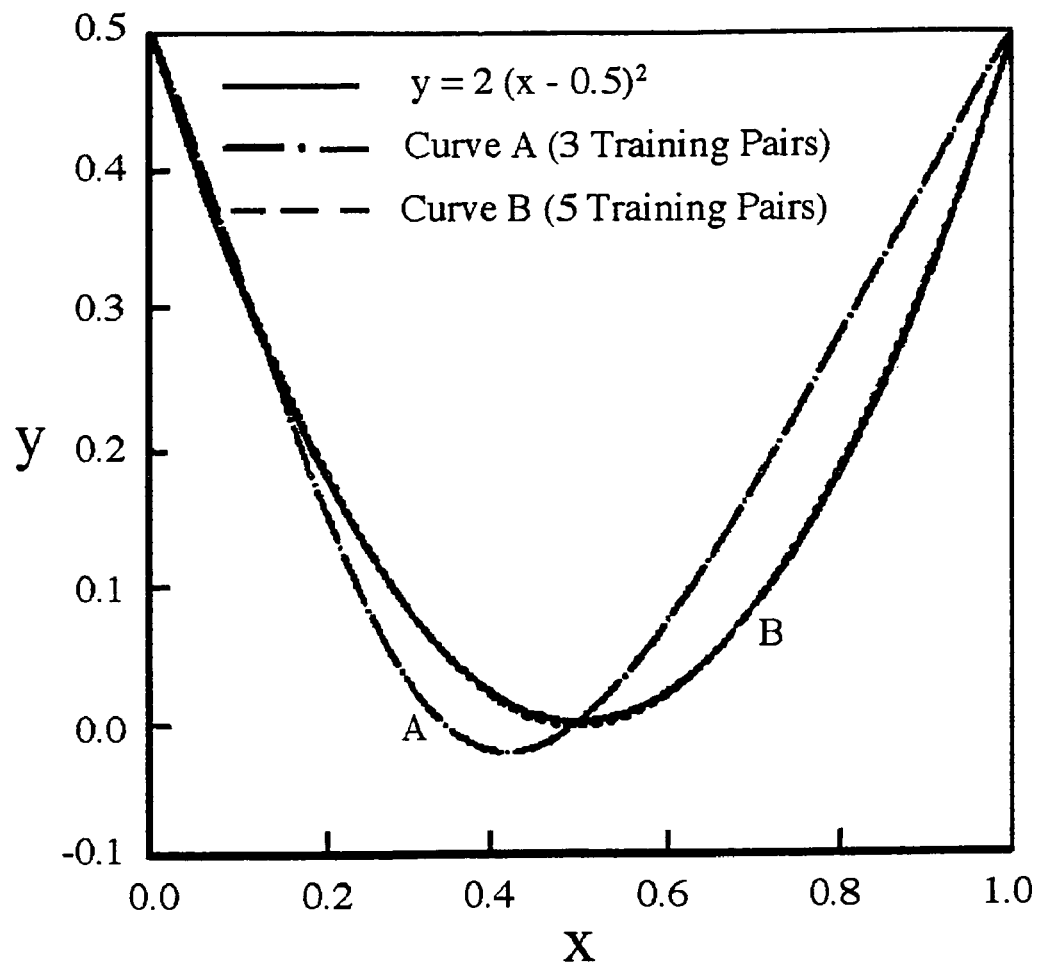
FIG. 1 graphically illustrates an improvement in match of a polynomial, where an increased number of training pairs is included in a simple NN analysis.
Figures 1, 9A:
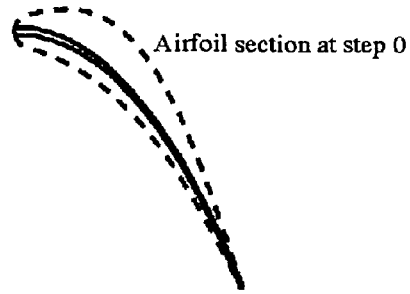
Figures 2, 9A:
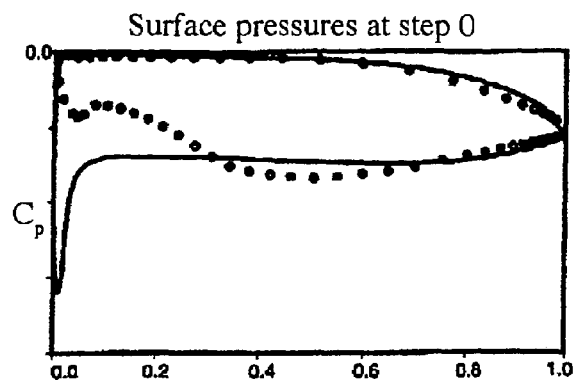
Figures 1, 9B:
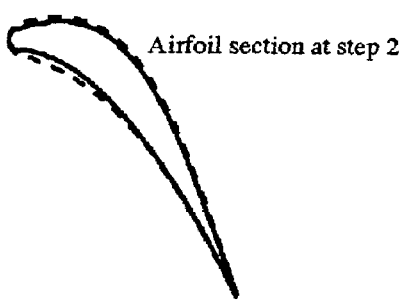
Figures 2, 9B:
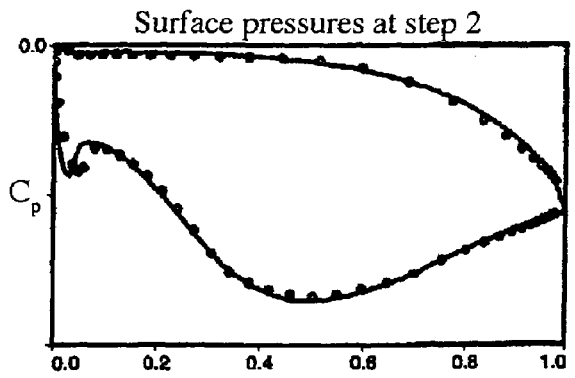
Figures 1, 9C:
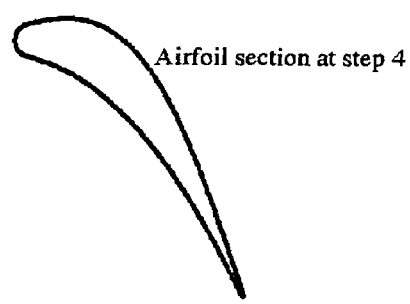
Figures 2, 9C:
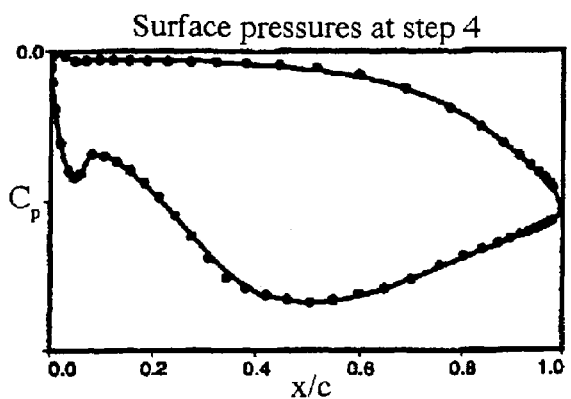

FIGS. 9A1–9C2 illustrate a sequence of partly-optimized designs for an airfoil, obtained using the invention, and compare each such design shape and corresponding airfoil pressure distribution to an target airfoil design shape and corresponding target airfoil pressure distribution. The objective function is defined as mean square error between resulting and target pressure distribution at a sequence of selected locations on the airfoil perimeter. One begins in FIG. 9A1 with a curvilinear shape of approximately uniform thickness, which provides a pressure distribution p along the airfoil perimeter as illustrated graphically in FIG. 9A2. FIGS. 9B1 and 9C1 illustrate the results of second and fourth iterative applications of an NN/SVM analysis according to the invention, and FIGS. 9B2 and 9C2 graphically illustrate the pressure distributions corresponding to FIGS. 9B1 and 9C1, respectively. Each iteration brings the resulting airfoil shape and pressure distribution closer to the target shape and target pressure distribution. After a fourth iteration of the NN/SVM analysis, the airfoil shape, shown in FIG. 9C1, produces a pressure distribution, shown in FIG. 9C2, that nearly precisely matches the target airfoil pressure distribution. Computations for this iterative sequence required about 8 minutes on a 16-processor SGI Origin computer.

Figure 10:
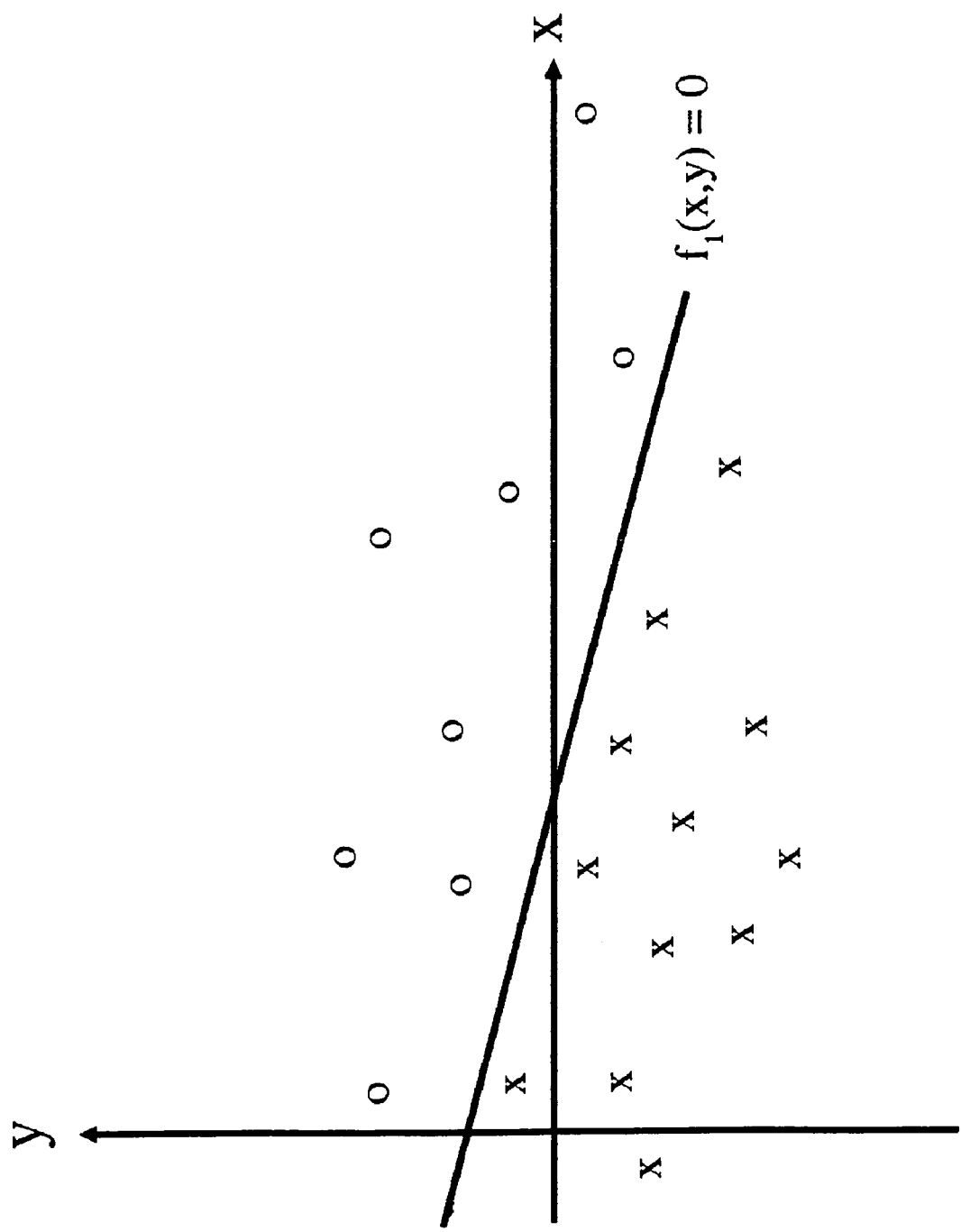
FIGS. 10 and 11A/11B illustrate data classification in two dimensions.

In a second embodiment, NN/SVM analysis is applied to data classification in a multi-dimensional vector space. In data classification, a discrimination mechanism must be determined that divides the data points into (at least) a first set of data points that satisfy a selected criterion, and a second set of data points that either do not satisfy the (first) criterion or that satisfy an inconsistent second criterion. FIG. 10 illustrates a collection of first set data points ("x") and second set data points ("o") in two (parameter) dimensions that are easily separated by a linear function of the two parameter coordinates, namely $$f_1(x,y) = a \cdot x + b \cdot y - c = 0, \tag{7}$$

where a, b and c are selected real values, with at least one of a and b being non-zero: All data points in the first data set and in the second data set lie on opposite sides of the line (hyperplane) $f_1(x,y)=0$. Here, the data point separation is straightforward.

Figure 11A:
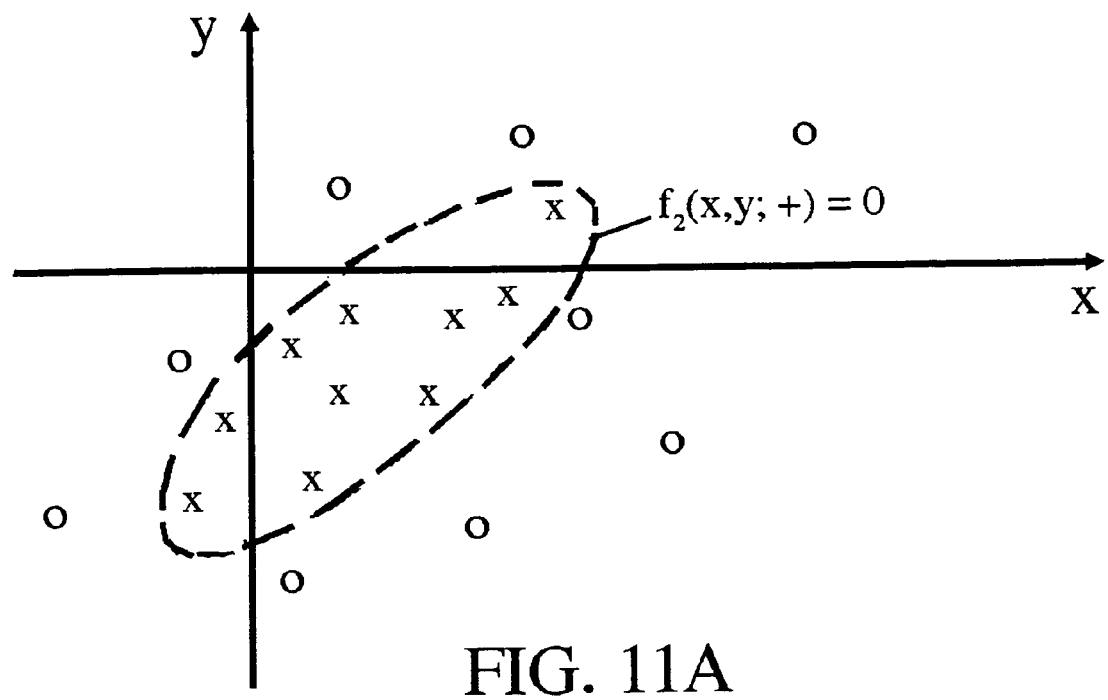
Figure 11B:
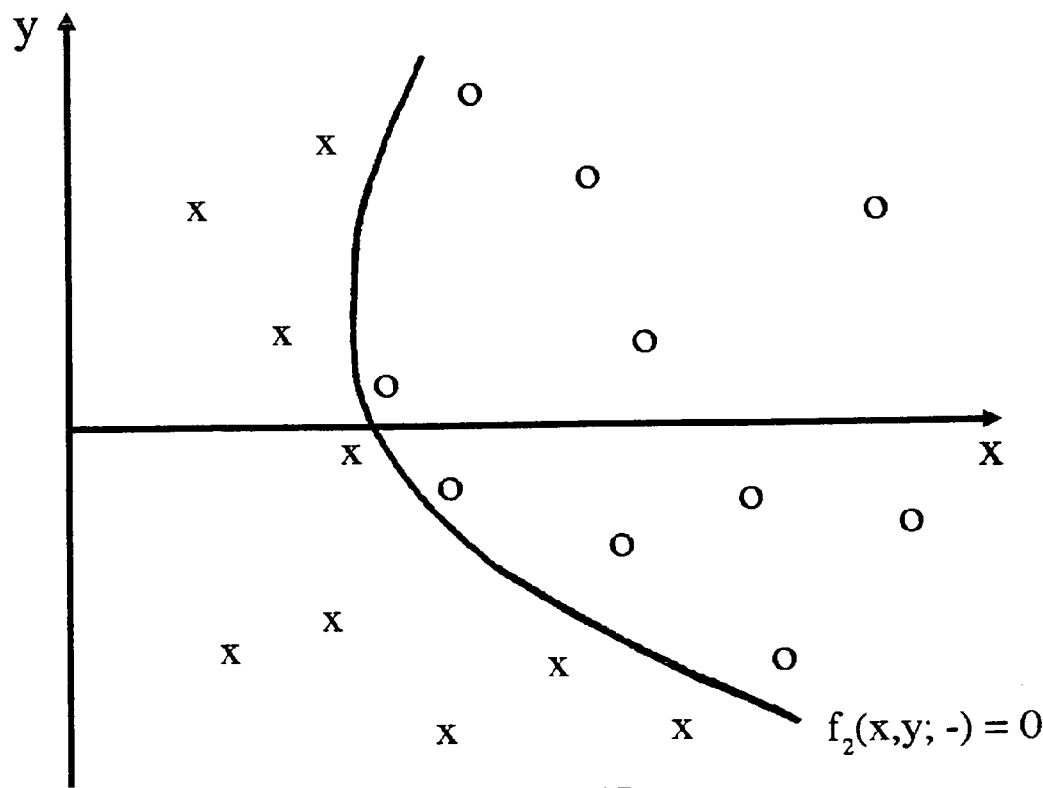

FIGS. 11A and 11B illustrate a collection of first set data points ("x") and second set data points ("o") that cannot be separated using a linear function of the two coordinates. An appropriate separation function may be $$f_2(x,y) = (a \cdot x + b \cdot y - c)^2 \pm (d \cdot x + e \cdot y - g)^2 = 1, \tag{8}$$

where $a \cdot d + b \cdot e = 0$ and a, b, c, d, e and g are selected real values, not all zero. The choice of the plus (+) sign in Eq. (8) produces an ellipse, and the choice of a minus (−) sign in Eq. (8) produces a hyperbola. In this instance, one set of appropriate coordinates for hyperplane separation in feature space is $$u_1 = x, \tag{9A}$$

$$u_2 = y, \tag{9B}$$

$$u_3 = (a \cdot x + b \cdot y - c)^2, \tag{9C}$$

$$u_4 = (d \cdot x + e \cdot y - g)^2, \tag{9D}$$

in which the separating hyperplane in feature space becomes $$u_3 \pm u_4 - 1 = 0. \tag{10}$$

The power of an SVM resides, in part, in its use of a qth order polynomial kernel (as an example) for vectors α and β, such as $$K(\alpha, \beta) = (\alpha \cdot \beta + 1)^q, \tag{11}$$

where q is a selected positive integer (e.g., q=2), rather than requiring an a priori definition of the polynomial terms to be used, as in Eqs. (9A)–(9D).

An advantage of the present invention, using NN/SVM analysis, over a conventional SVM analysis is that the kernel, such as the one given in Eq. (11), and the associated feature space need not be specified a priori; the appropriate feature space is automatically generated by the NN component of the NN/SVM system during the training process.

Figure 12:
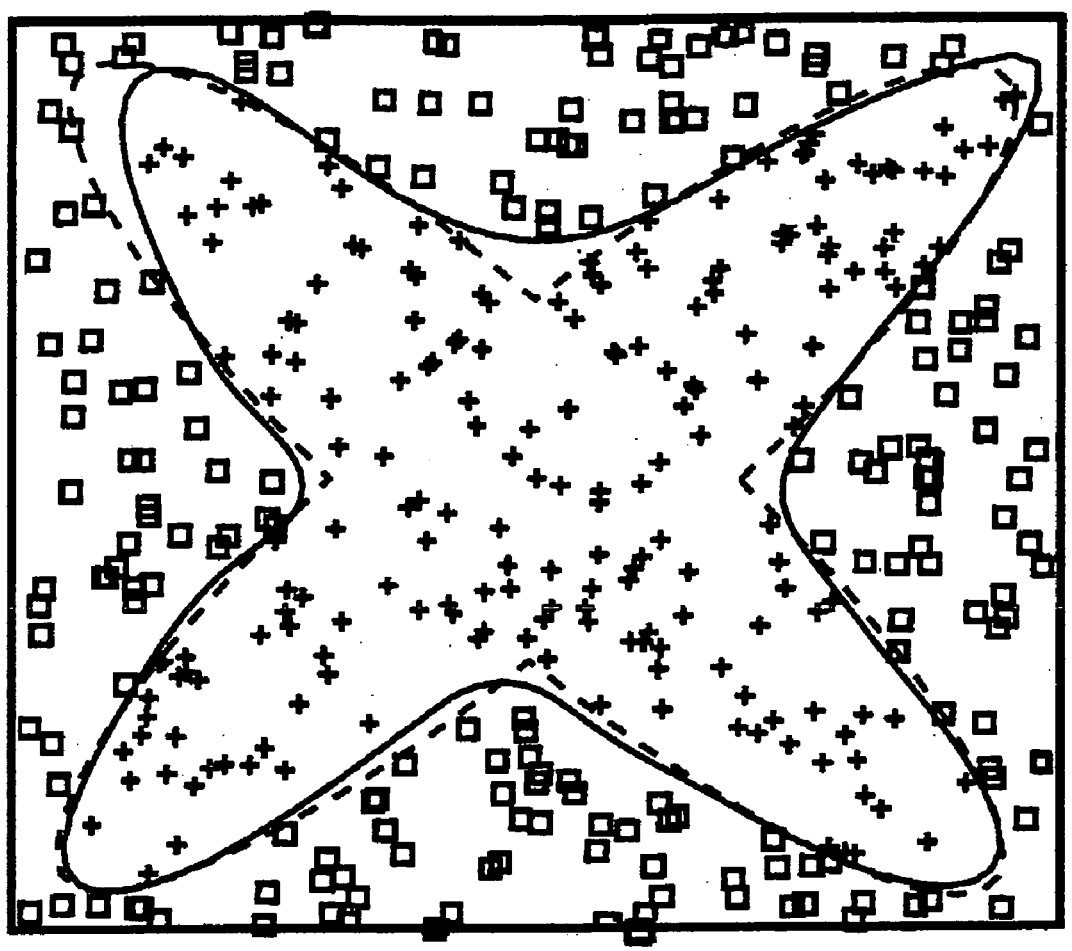
FIG. 12 graphically illustrates data classification according to the invention.

FIG. 12 illustrates an application of the NN/SVM system to data classification, with M=2. Two classes of data that are separable, indicated as crosses and squares, are provided for the system. The exact boundary between the two classes is defined by first and second intersecting ellipses in two dimensions, with the major axes being oriented at 45° and at 135° relative to an x-axis in an (x,y) region ρ defined by $$\rho = \{(x,y) | 0 \leq x \leq 2.5, 0 \leq y \leq 2.5\}. \tag{12}$$

Four hundred data points were randomly generated in this region and were first classified according to the exact boundaries. The boundaries were then removed, and only the locations of the data points were provided to the NN/SVM system. The resulting decision boundary generated by the NN/SVM system is shown as a solid line in FIG. 12. More generally, if M-parameter data points are provided, with M≧2, the data separation surface or hyperplane will have dimension at most M-1.

The NN/SVM system provides a perfect classification of the original data, with zero mis-assignments, without requiring any specification of kernel functions or feature spaces. Where the solid boundary line and the dotted boundary lines differ, no data points were located in the intervening regions between these boundaries. Provision of additional data points in one or more of these intervening regions would provide a resulting (solid) NN/SVM boundary line that is closer to the exact (dotted) boundary line.

If r is a ratio of the sum of the absolute value of the intervening regions corresponding to the boundary lines mismatch, and the area of the square (6.25 units$^2$ in FIG. 12), the ratio r is a very small number that will tend toward zero as the number of data points (assumed to be approximately uniformly distributed) increases without bound. Additionally, r (defined as a percentage) represents the number of misclassifications (also expressed as a percentage) that an NN/SVM-generated boundary will produce on a very large test set.

APPENDIX

Examples of an NN analysis and of an SVM analysis are presented here. The invention is not limited to a particular NN analysis or to a particular SVM analysis.

Consider an object, represented by a group of coordinates $x = (x^1, x^2, \ldots, x^N)$, for which some physical feature or response of the object is to be optimized. The object may be a aircraft wing or turbine blade for which an ideal pressure distribution at specified locations on the object is to be achieved as closely as possible. The object may be a chemically reacting system with desired percentages of final compounds, for which total thermal energy output is minimized. The object may be represented at spaced apart locations or at spaced apart times by a group of independent coordinates, and an objective or cost function is presented, representing the response to be optimized. One or more constraints, either physical or numerical, are also set down, if desired.

In an NN analysis, one relevant problem is minimizing empirical risk over a sum of linear indicator or characteristic functions $$f(x, w) = \theta \left\{ \sum_{i=1}^{N} w_i \cdot x^i \right\}, \tag{A-1}$$

where θ is an indicator or characteristic function, x is a coordinate vector and w is a vector of selected weight coefficients. Consider a training set of (N+1)-tuples $(x_1, y_1)$, $(x_2, y_2), \ldots, (x_K, y_K)$, where each $x_j = (x_j^1, x_j^2, \ldots, x_j^N)$ is an N-tuple representing a vector and $y_j$ is a scalar having only the values −1 or +1.

The indicator function θ(z) has only two values, 0 and 1, and is not generally differentiable with respect to a variable in its argument. The indicator function θ(z) in Eq. (A-1) is often replaced by a general sigmoid function S(z) that is differentiable with respect to z everywhere on the finite real line, is monotonically increasing with z, and satisfies $$Lim_{z \to -\infty} S(z) = 0, \tag{A-2a}$$

$$Lim_{z \to +\infty} S(z) = 1. \tag{A-2b}$$

Examples of suitable sigmoid functions include the following:

$$S(z)=1/\{1+\exp(-\alpha z)\},$$

$$S(z)=\{1+\tanh(\beta \cdot z+\chi)\}/2$$

$$S(z)=\{\pi+2\cdot\tan^{-1}(\delta\cdot z+\epsilon)\}/2\pi,$$

where $\alpha$, $\beta$ and $\delta$ are selected positive values. The indicator sum $f(x,w)$ in Eq. (A-1) is replaced by a modified sigmoid sum $$G(x, w) = S\left\{\sum_{i=1}^{N} w_i \cdot x^i\right\}. \tag{A-3}$$

where S is a selected linear or nonlinear function.

In order to minimize the empirical risk, one must determine the parameter values $w_i$ that minimize an empirical risk functional $$R_{emp}(w) = \sum_{j=1}^{K}(y_j - F(x_j, w))^2 / K, \tag{A-4}$$

which is differentiable in the vector components w. One may, for example, use a gradient search approach to minimize $R_{emp}(w)$. The search may converge to a local minimum, which may or may not be a global minimum for the empirical risk.

Assume, first, that the training data $\{(x_j, y_j)\}$ can be separated by an optimal separating hyperplane, defined by $$(w\cdot x_j)-g=0, \tag{A-5}$$

where g partly defines the hyperplane. A separating hyperplane satisfies $$(w\cdot x_j)-g \geq 1 \;(y_j \geq 1), \tag{A-6a}$$

$$(w\cdot x_j)-g \leq -1 \;(y_j \leq -1), \tag{A-6b}$$

An optimal separating hyperplane maximizes the functional $$\Phi(w)=(w\cdot w)/2, \tag{A-7}$$

with respect to the vector values w and the value g, subject to the constraints in Eqs. (A-6a)–(A-6b). Unless indicated otherwise, all sums in the following are understood to be over the index j (j=1, ..., K).

A solution to this optimization problem is given by a saddle point of a Lagrange functional $$L(w, g, \alpha) = (w\cdot w)/2 - \sum_{j=1}^{K} \alpha_j\{((x_j \cdot w) - g)\cdot(y_j - 1)\}. \tag{A-8}$$

At a saddle point, the solutions $(w,g,\alpha)$ satisfy the relations $$\partial L/\partial g = 0, \tag{A-9}$$

$$\partial L/\partial w = 0, \tag{A-10}$$

with the associated constraint $$\alpha j \geq 0, \tag{A-11}$$

Equation (A-9) yields the constraint $$\sum_{j=1}^{K} \alpha_j \cdot y_j = 0. \tag{A-12}$$

Equation (A-10) provides an expression for the parameter vector w of an optimal hyperplane as a linear combination of vectors in the training set $$w=\Sigma y_j \cdot \alpha_j \cdot x_j, \tag{A-13}$$

An optimal solution $(w,g,\alpha)$ must satisfy a Kuhn-Tucker condition $$\alpha j\{((x_j\cdot w)-g)\cdot(y_j-1)\}=0 \;(=1, \ldots, K). \tag{A-14}$$

Only some of the training vectors, referred to herein as "support vectors," have non-zero coefficients in the expansion of the optimal solution vector w. More precisely, the expansion in Eq. (A-13) can be rewritten as $$w=\Sigma y_j \cdot \alpha_j \cdot x_j. \tag{A-15}$$

support vectors

Substituting the optimal vector w back into Eq. (A-8) and taking into account the Kuhn-Tucker condition, the Lagrange functional to be minimized is re-expressed as $$L(\alpha) = \sum_{j=1}^{K} \alpha_j - (1/2)\sum_{i,j=1}^{K} \alpha_i \cdot \alpha_j \cdot y_i \cdot y_j \cdot (x_i \cdot x_j). \tag{A-16}$$

This functional is to be maximized, subject to the constraints expressed in Eqs. (A-13) and (A-14). Substituting the expression for optimal parameter vector w into Eq. (A-14), one obtains $$(w\cdot x)-g=\Sigma\alpha_j(x_j\cdot x)-g=0. \tag{A-17}$$

The preceding development assumes that the training set data $\{(x_j, y_j)\}$ are separable by a hyperplane. If these data are not separable by a hyperplane, one introduces non-negative slack variables $\chi_j$ (j=1, ..., K) and a modified functional $$\Phi(w)=(w\cdot w)+C\cdot\Sigma\chi_j, \tag{A-18}$$

subject to the constraints $$y_j\cdot((w\cdot x_j)-g) \geq 1-\chi_j \tag{A-19}$$

where the (positive) coefficient C corresponds to an interpenetration of two or more groups of training set (N+1)-tuples into each other (thus, precluding separation by a hyperplane). Repeating the preceding analysis, where the functional $\Phi(w)$ replaces the term $(w\cdot w)$, an optimal solution $(w,g,\alpha)$ is found as before by maximizing a quadratic form, subject to the modified constraints $$\Sigma\alpha_j y_j=0., \tag{A-20a}$$

$$0 \leq \alpha_j \leq C. \tag{A-20b}$$

Use of (only) hyperplanes in an input space is insufficient for certain classes of data. See the examples in FIGS. 11A and 11B.

In a support vector machine, input vectors are mapped into a high dimension feature space Z through a selected nonlinear mapping. In the space Z, an optimal separating hyperplane is constructed that maximizes a certain Δ-margin associated with hyperplane separation.

First, consider a mapping that allows one to construct decision polynomials of degree 2 in the input space. One creates a (quadratic) feature space Z having dimension M=N(N+3)/2, with coordinates $$u_j = x^j (j=1, \ldots, N; \text{ N coordinates}) \quad \text{(A-21a)}$$

$$u_{j+N} = x_j^2 \ (j=1, \ldots, N; \text{ N coordinates}) \quad \text{(A-21b)}$$

$$u_{j+2N} = x_1 \cdot x_2, \ x_1 \cdot x_3, \ \ldots, \ x_{N-1} \cdot x_N, \ (N(N-1)/2 \text{ coordinates}). \quad \text{(A-21c)}$$

A separating hyperplane constructed in the space Z is assumed to be a second degree polynomial in the input space coordinates $x_j (j=1, \ldots N)$.

By analogy, in order to construct a polynomial of degree k in the input coordinates, one must construct a space Z having of the order of $N^k$ coordinates, where one constructs an optimal separating hyperplane. For example, for k=4, the maximum number of coordinates needed in the space Z is $$\binom{N+k}{k}_{k=4}, \quad \text{(A-22)}$$

which is about $10^8$ coordinates for a modest size input space of N=100 independent coordinates.

For a quadratic feature space Z, one first determines a kernel function K of inner products according to $$(u_{L1} \cdot u_{L2}) = K(x_{j1}, x_{j2}) = K(x_{j2}, x_{j1}) \ (L1, L2=1, \ldots, N(N+3)/2). \quad \text{(A-23)}$$

One constructs nonlinear decision functions $$I(x) = sgn\{\Sigma \alpha_j K(x, x_j) + b0\} \quad \text{(A-24)}$$

support vectors that are equivalent to the decision function Φ(x) in Eq. (A-18). By analogy with the preceding, the coefficients $\alpha_j$ are estimated by solving the equation $$W(\alpha) = \Sigma \alpha_j - (\frac{1}{2}) \Sigma \alpha_i \cdot \alpha_j \cdot x_i \cdot x_j \cdot K(x_b x_j) \quad \text{(A-25)}$$

with the following constraint (or sequence of constraints) imposed:

$$\Sigma \alpha_j \cdot y_j = 0 \quad \text{(A-26a)}$$

$$\alpha_j \geq 0. \quad \text{(A-26b)}$$

Mercer (1909) has proved that a one-to-one correspondence exists between the set of symmetric, positive definite functions κ(x,y) defined on the real line that satisfy $$\int\int \kappa(x,y) f(x) f(y) \, dx \, dy \geq 0 \quad \text{(A-27)}$$

for any L2-integrable function f(x) satisfying $$\int f(x)^2 \, dx < \infty \quad \text{(A-28)}$$

and the set of inner products defined on that function space {f}. Thus, any kernel function $K(x_{j1}, x_{j2})$ satisfying conditions of the Mercer theorem can be used to construct an inner product of the type set forth in Eq. (A-23). Using different expressions for the kernel $K(x_{j1}, x_{j2})$, one can construct different learning machines with corresponding nonlinear decision functions.

For example, the kernel function $$K(x', x'') = \{(x' \cdot x'') + 1\}^q, \quad \text{(A-29)}$$

can be used to specify polynomials of degree up to q (preferably an integer).

Much of the preceding development is taken from V.N. Vapnik, "An Overview of Statistical Learning Theory", IEEE Trans. Neural Networks, vol. 10 (1999), pp. 988–999. The present invention provides a hybrid approach in which the input layer and hidden layer(s) of an NN component are used to create a data-adaptive feature space for an SVM component. As indicated in the preceding, the combined NN/SVM analysis of the invention is not limited to the particular NN analysis or to the particular SVM analysis set forth in this Appendix.

What is claimed is:

1. A computer implemented machine learning method for use in engineering applications, including but not limited to optimizing designs, classifying data and generating regression estimates, that is a hybrid of neural net ("NN") analysis and support vector machine ("SVM") analysis, the method comprising:

(a) providing an NN component, having an input layer and a hidden layer and an input vector space, where the NN component automatically generates coordinates in a feature vector space, and providing an SVM component that utilizes the feature vector space;

(b) selecting a group of parameters and combinations of parameters and providing a feature space coordinate, in the feature vector space, for each selected parameter and selected parameter combination in the input space for use in at least one of optimizing a design, controlling a physical or chemical process, classifying data and generating regression estimates for a collection of the data;

(c) providing at least one vector of candidate parameter values for each of the group of parameters in the input space;

(d) providing initial values for connection weights between the input layer and the hidden layer for the NN component;

(e) computing hidden layer output signals, corresponding to the connection weight values, for each of the parameter value vectors;

(f) using at least one hidden layer output signal as a feature space coordinate for the SVM component;

(g) determining inner product values of a selected number of at least two feature space coordinates;

(h) providing a Lagrange functional using the determined inner product values;

(i) providing at least two constraints, expressed in terms of Lagrange multipliers and input vector space data;

(j) minimizing the Lagrange functional, subject to at least one selected constraint, to obtain Lagrange multiplier values corresponding to the minimized Lagrange functional;

(k) computing a training error, using the connection weights for the NN component and the Lagrange multiplier values for the SVM component;

(l) when the computed training error is greater than a selected threshold value, changing at least one of the connection weights and repeating steps (e)–(k) at least once, wherein at least one feature space coordinate value changes automatically in response to change in the at least one connection weight; and (m) when the computed training error is not greater than the threshold value, interpreting the NN component with the associated connection weights and the SVM component with the associated Lagrange multipliers as a trained NN/SVM system.

2. The method of claim 1, further comprising augmenting said inner product value with at least one user-specified inner product value in said SVM component.

3. The method of claim 1, further comprising:

providing a collection of N data points in an M-dimensional space for said input space, where $M \geq 2$ and $N \geq 2$, and where each data point is assigned an indicium associated with one of at least first and second mutually exclusive sets; and applying the method of claim 1 for determination of a separation surface in the M-dimensional space that separates the data points into at least first and second mutually exclusive regions that contain substantially all data points in the first set and in the second set, respectively.

4. The method of claim 3, further comprising providing a visually perceptible view of at least a portion of said separation surface in at least two dimensions.

5. The method of claim 1, wherein said use in engineering applications comprises design of a airfoil representing a wing or other control surface of an aircraft.

6. The method of claim 5, further comprising:

providing an optimization method; and using the optimization method in at least one of steps (e) through (k) to obtain at least one of said connection weight values, said Lagrange multiplier values and said inner product value for said aircraft airfoil.

7. The method of claim 5, further comprising determining an optimized design for said aircraft airfoil by applying a response surface analysis to said design, using said trained NN/SVM system.

8. The method of claim 7, further comprising providing a selected optimization procedure in determining said optimized design.

9. The method of claim 5, further comprising computing said training error by a process comprising:

providing a collection of at least two desired pressure values, with each desired pressure value corresponding to a location on said airfoil;

computing a pressure value at each of the selected locations on said airfoil, using said minimized Lagrangian functional; and computing said training error as a sum of magnitudes of differences between the desired pressure value and the computed pressure value at each of the selected locations on said airfoil.

10. The method of claim 5, further comprising computing said airfoil by a process comprising:

(n) providing a collection of a least two desired pressure values, with each desired pressure value corresponding to a location on said airfoil;

(o) providing an initial airfoil shape;

(p) computing a pressure distribution for said airfoil for at least one perturbation in the initial airfoil shape;

(q) representing variation of pressure with the at least one perturbation in the initial airfoil shape, using said NN component and said SVM component, wherein said NN input vector corresponds to the at least one perturbation in the initial airfoil shape and an SVM output signal corresponds to at least one change in the pressure distribution;

(r) computing an objective function value, which is to be minimized for said airfoil design optimization, as a sum of magnitudes of a power of differences between the desired pressure value and a pressure value using said NN component and said SVM component;

(s) when the objective function value is greater than a selected threshold value, repeating steps (p)–(r) at least once; and (t) when the objective function not greater than the threshold value, interpreting this condition as indicating that an optimal airfoil design is identified.

11. The method of claim 1, wherein said use in engineering applications comprises design of a airfoil representing at least one turbine or compressor airfoil.

* * * * *